Nov. 19, 1935. A. P. DE SEVERSKY 2,021,876
AIRCRAFT LANDING GEAR
Original Filed April 25, 1928 3 Sheets-Sheet 1
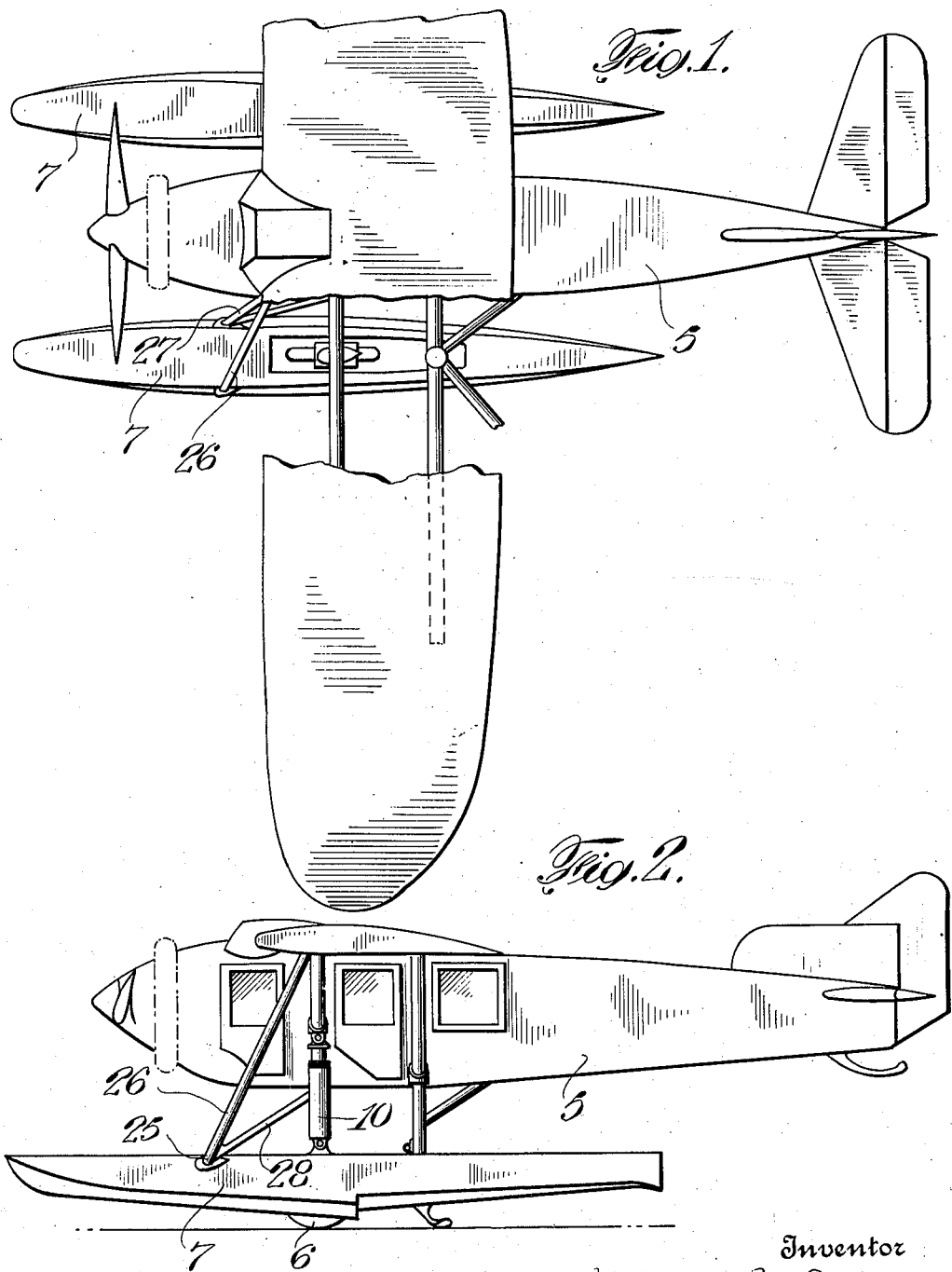

Nov. 19, 1935.    A. P. DE SEVERSKY    2,021,876
AIRCRAFT LANDING GEAR
Original Filed April 25, 1928    3 Sheets-Sheet 2
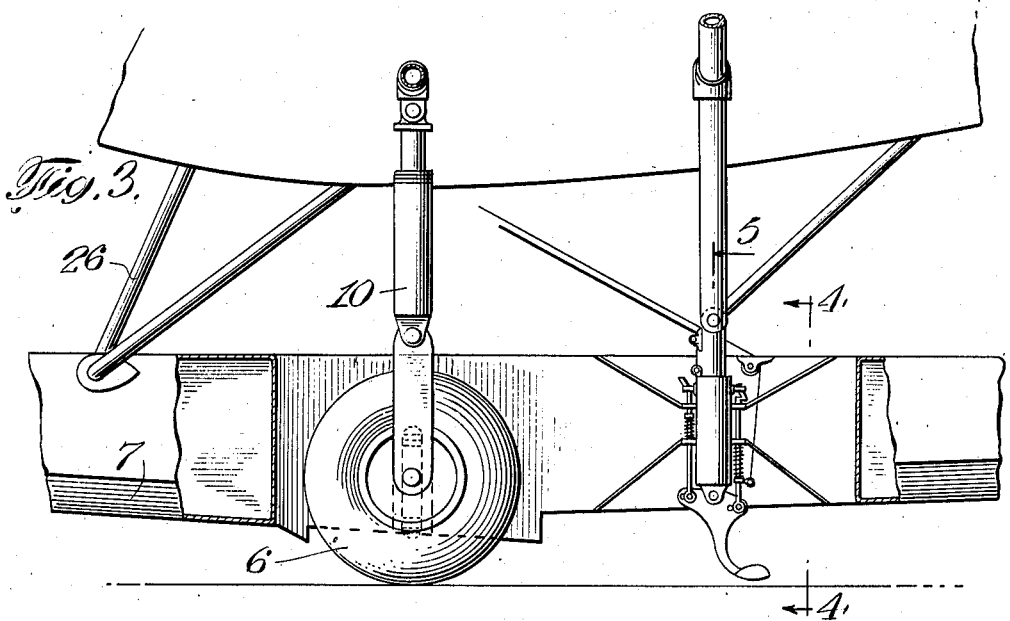
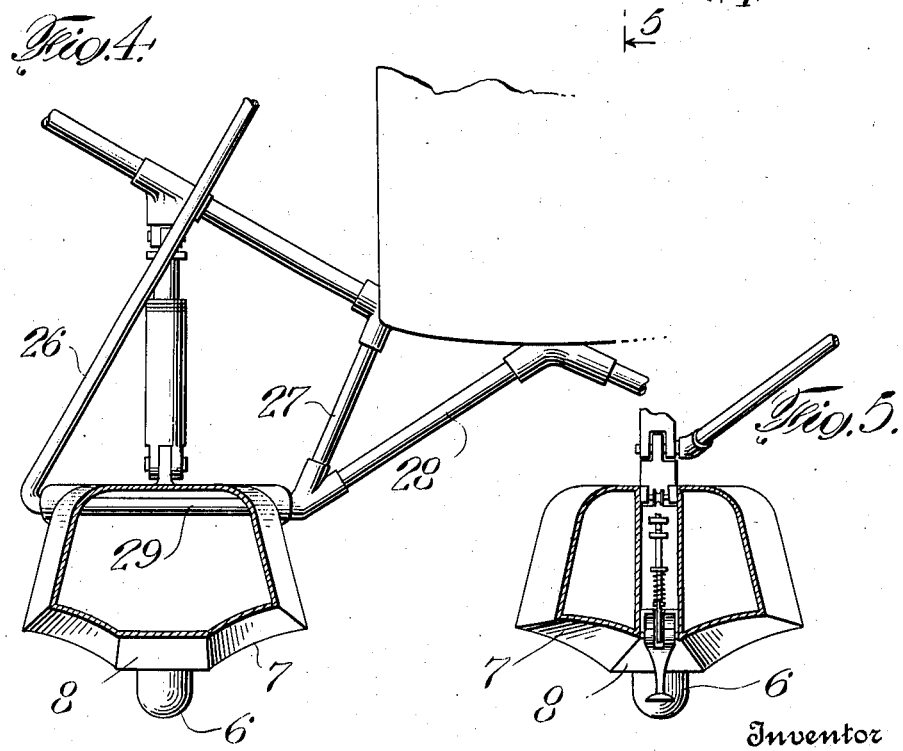
Inventor
Alexander P. de Seversky
By Attorney
Maurice B. Sanders

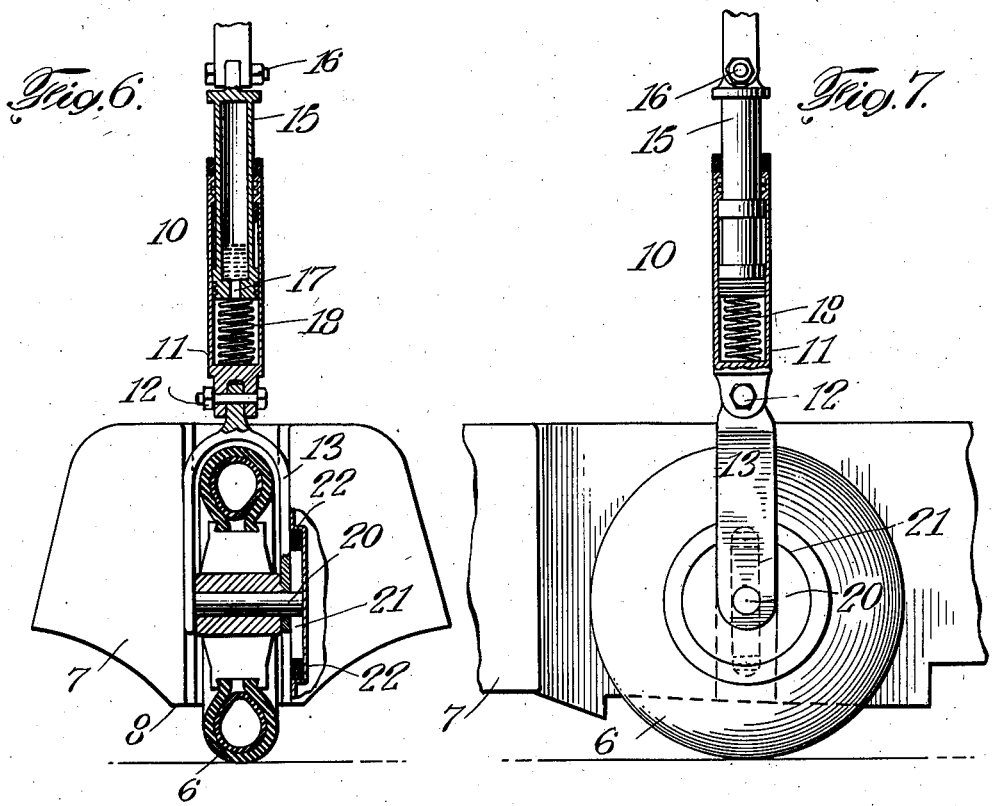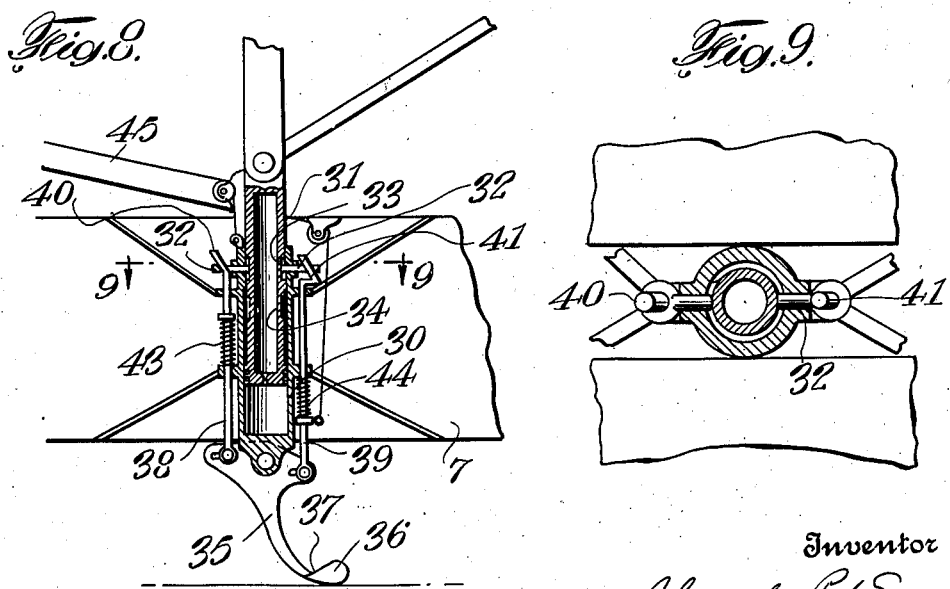

Patented Nov. 19, 1935

2,021,876

UNITED STATES PATENT OFFICE 2,021,876

AIRCRAFT LANDING GEAR

Alexander P. de Seversky, New York, N. Y., assignor, by mesne assignments, to Seversky Aircraft Corporation, a corporation of Delaware Application April 25, 1928, Serial No. 272,628
Renewed January 9, 1932

9 Claims. (Cl. 244—2)

The present invention relates to aircraft and has for an object to provide an improved amphibian landing gear.

The invention provides a landing gear having in a preferred embodiment a plurality of pontoons together with a plurality of wheels connected to the craft, the pontoons and wheels being alternatively operable to take the load when landing on the water or on the ground respectively:

The arrangement of the preferred embodiment is such that the pontoons are maintained locked in fixed position relative to the body of the craft when landing on the water but automatically released for movement toward the craft to permit engagement of the wheels with the ground when landing on the ground.

The nature and objects of the invention will be better understood from a description of a selected embodiment for the purpose of which description reference should be had to the accompanying drawings forming a part hereof and in which Figure 1 is a plan view of an aircraft showing a landing gear embodying the invention, Figure 2 is a view in side elevation of the same, Figure 3 is an enlarged detail view, partly in section, showing the locking and releasing means which controls the position of the pontoon, Figure 4 is a detail sectional view taken on the line 4—4 of Fig. 3, Figure 5 is a detail sectional view taken on the line 5—5 of Fig. 3, Figure 6 is a sectional view taken through a hydraulic shock absorber and landing wheel, Figure 7 is a detail sectional view of the same, Figure 8 is a detail central sectional view of the pontoon locking means, Figure 9 is a detail sectional view taken on the line 9—9 of Fig. 8.

Referring to the embodiment shown for the purposes of illustrating the invention there is connected to the aircraft body 5 an amphibian landing gear comprising landing wheels 6 and landing pontoons 7 adapted for alternative use in landing on the ground or on the water. Each pontoon is formed with a wide flat central portion 8 forming a ski for better landing on snow or ice. The wheels are connected to the aircraft body relatively rigidly but the pontoons are connected for vertical movement whereby they may either extend below the wheels for engagement with snow or ice or they may be lifted sufficiently to insure good engagement of the wheels with the ground. As shown best in Figs. 6 and 7 the wheels are connected to the aircraft body by means of fluid shock absorbers 10. Each shock absorber comprises a cylinder 11 pivoted at 12 to the wheel yoke 13 and houses a plunger 15 pivoted to the body of the craft at 16. The cylinder contains a quantity of oil which may flow through a restricted opening 17 into the hollow plunger 15. A spring 18 tends to hold the shock absorber in extended relation and to take part of the load of the craft in landing.

The axle 20 of the landing wheel preferably extends laterally through the yoke 13 at both ends and moves in a vertical guiding slot 21 in the structure of the pontoon. At each end of each slot rubber buffer members 22 are provided to cushion the movement of the axle at both ends of its travel. The yoke is movable vertically in guides serving to maintain it in suitable vertical position.

It will be understood that the arrangement of the wheels within the pontoon is a preferred construction but it is not a necessary arrangement.

The vertical movement of the pontoons is obtained in the embodiment illustrated by pivoting the pontoons to the body of the craft at a point spaced from the wheels and arranging for pivotal movement in the longitudinal vertical plane about the point of connection. As shown the pontoons 7 are pivotally supported at 25 on a horizontal axis at a point spaced forwardly from the wheels 6. A frame work comprising struts 26, 27 and 28 provides rigid support for horizontal transverse axle members 29 on which the pontoons 7 are mounted for pivotal movement in vertical planes. The pontoons are arranged to be held in fixed position relative to the body of the craft by mechanisms arranged to lock the pontoon rigidly in position until released but adapted to be automatically released when landing on the ground to permit upward movement of the pontoon thereby to expose the wheel for landing and permit it to yield toward the body of the craft. It is to be noted that the pontoons shown are complete pontoons as distinguished from sectional pontoons in which each pontoon comprises one or more separate pontoon sections. The term "complete pontoon" is used in the claims in this sense.

As best shown in Fig. 8 this mechanism comprises a cylinder 30 rigidly secured in the pontoon and receiving therein a plunger 31 carried by the body of the craft. The plunger 31 may be locked in fixed position in the cylinder 30 by means of dogs 32 engageable alternately in recesses 33 or 34. Ordinarily these dogs 32 engage the upper recesses 33 to hold the pontoons in horizontal position but when desired they may be released and the pontoon allowed to drop whereupon they will engage the recesses 34. The means shown for operating the dogs 32 comprises a ground engaging lever 35 which upon engaging the ground will release the dogs but will not so act when water is engaged. As shown in Figs. 5 and 8 this lever is formed with a laterally extended foot 36, having an upper sloping face 37 adapted to cause a downward force rather than an upward releasing force when landing on the water. This lever 35 operates vertical plungers or rods 38 and 39 having diagonal cam members 40, 41 at their upper ends engaging the dogs 32. Springs 43, 44 normally urge the rods 38 and 39 to position to project the dogs 32 into locking position. A tension member 45 secured to the rod 39 provides for manual operation to release the dogs and permit adjustment of the pontoon when desired.

The foregoing particular description is illustrative merely and is not intended as defining the limits of the invention.

I claim—

1. An amphibian landing gear for aircraft comprising in combination a wheel adapted to be carried by the body of the craft, a pontoon also carried by the body of the craft to support the weight thereof, a lock for holding the pontoon in landing position and means engageable with the ground upon landing on the ground for releasing said lock.

2. An amphibian landing gear for aircraft comprising, in combination, a wheel adapted to be carried by the body of the craft, a pontoon adapted to be carried by the body of the craft, means for holding the pontoon down relative to the wheel in operative position and means engageable with the ground to automatically release the pontoon to permit upward movement thereof.

3. An amphibian landing gear, as defined in claim 2, further characterized that the ground engaging member is so constructed that when engaging the ground it will be moved operatively but when engaging the water it will not be so moved.

4. An amphibian landing gear for aircraft comprising, in combination, a wheel and a pontoon alternatively operable to support the craft and means for rendering said wheel and pontoon alternatively operative comprising a depending ground engaging member having a foot presenting an inclined surface engageable with water to exert a downward pressure but engageable with the ground to exert an upward pressure, substantially as described.

5. An amphibian landing gear for aircraft comprising in combination a complete pontoon pivoted at its forward end to the body of an aircraft, a wheel connected to said aircraft by a shock absorbing mechanism and connected to said pontoon for relative vertical movement and means actuated by engagement with the ground for retracting said pontoon upon landing on the ground.

6. An amphibian landing gear for aircraft comprising, in combination, a complete pontoon pivoted at its forward end to the body of an aircraft, a wheel, connections including a shock absorber between said wheel and aircraft, interengaging guiding means between the pontoon and wheel to control the relative vertical movement and means whereby the pontoon may be held in substantially fixed position for landing on water, said means being capable of being actuated by engagement with the ground to release the pontoon for upward movement to expose the wheel for landing on the ground.

7. An amphibian landing gear for aircraft comprising, in combination, a complete pontoon pivoted at its forward end to the body of an aircraft, a wheel, connections including a shock absorber between said wheel and aircraft, interengaging guiding means between the pontoon and wheel to control the relative vertical movement and means whereby the pontoon may be held in substantially fixed position for landing on water or released for upward movement to expose the wheel for landing on the ground and means actuated by engagement with the ground for releasing the holding means.

8. An amphibian landing gear for aircraft comprising pontoon means and a ground-engaging wheel, means for controlling the position of the pontoon including a ground-engaging element and connections thereto adapted when the ground engaging element engages the water to maintain the pontoon locked in position for landing on the water and adapted when the ground-engaging element engages the ground to be actuated thereby to release the pontoon from locked position for landing on the ground substantially as described.

9. A landing gear for aircraft comprising in combination of a pair of pontoons constituting the entire support for the aircraft when landing upon the water, a pivotal supporting connection toward the forward end of each pontoon for movably connecting the pontoon to the body of the aircraft, a second supporting connection toward the rear end of each pontoon for connecting the pontoon to the body of the aircraft, a pair of landing wheels connected to the body of the craft between the forward and rear supporting connections, the pontoons and wheels being movable vertically relative to the body of the craft independently of each other, means for locking the pontoons in position for landing on the water and means actuated by engagement with the ground for releasing the locking means when landing upon the ground.

ALEXANDER P. DE SEVERSKY.